(12) United States Patent
Inoue

(10) Patent No.: US 7,405,754 B2
(45) Date of Patent: Jul. 29, 2008

(54) IMAGE PICKUP APPARATUS

(75) Inventor: Masashi Inoue, Asaka (JP)

(73) Assignee: Fujifilm Corporation, Tokyo (JP)

( * ) Notice: Subject to any disclaimer, the term of this patent is extended or adjusted under 35 U.S.C. 154(b) by 593 days.

(21) Appl. No.: 10/732,302

(22) Filed: Dec. 11, 2003

(65) Prior Publication Data

US 2004/0119837 A1 Jun. 24, 2004

(30) Foreign Application Priority Data

Dec. 12, 2002 (JP) ............................. 2002-360617

(51) Int. Cl.
*H04N 5/76* (2006.01)
*G10L 15/00* (2006.01)
*G10L 15/04* (2006.01)
*G10L 11/00* (2006.01)
*G10L 21/00* (2006.01)

(52) U.S. Cl. ..................... 348/231.2; 704/251; 704/275

(58) Field of Classification Search ............. 348/231.2, 348/207.99; 704/231, 251, 270, 275
See application file for complete search history.

(56) References Cited

U.S. PATENT DOCUMENTS

| | | | | |
|---|---|---|---|---|
| 4,389,109 A * | 6/1983 | Taniguchi et al. ............. 396/56 |
| 5,477,511 A * | 12/1995 | Englehardt ................... 704/251 |
| 6,038,295 A * | 3/2000 | Mattes ..................... 348/211.3 |
| 6,289,140 B1 | 9/2001 | Oliver |
| 6,499,016 B1 * | 12/2002 | Anderson .................... 704/275 |
| 6,970,192 B2 * | 11/2005 | Takayama ................. 348/231.2 |
| 7,002,625 B2 * | 2/2006 | Takahashi ................ 348/231.2 |
| 7,136,102 B2 * | 11/2006 | Misawa .................... 348/231.3 |
| 2003/0107529 A1 * | 6/2003 | Hayhurst et al. ............. 345/1.1 |
| 2003/0189642 A1 * | 10/2003 | Bean et al. ................ 348/207.1 |
| 2003/0204403 A1 * | 10/2003 | Browning ................... 704/270 |
| 2003/0227553 A1 * | 12/2003 | Mattis et al. ............. 348/231.2 |
| 2004/0041921 A1 * | 3/2004 | Coates ..................... 348/231.2 |
| 2004/0056972 A1 * | 3/2004 | Jang et al. ............. 348/333.01 |
| 2004/0145863 A1 * | 7/2004 | Son ............................ 361/683 |
| 2005/0018057 A1 * | 1/2005 | Bronstein et al. ........ 348/231.3 |
| 2005/0052549 A1 * | 3/2005 | Schinner et al. .......... 348/231.2 |
| 2005/0075881 A1 * | 4/2005 | Rigazio et al. ............. 704/270 |

FOREIGN PATENT DOCUMENTS

| | | | |
|---|---|---|---|
| JP | 2000-215021 A | | 8/2000 |
| JP | 2001054041 A | * | 2/2001 |
| JP | 2001-169222 A | | 6/2001 |

* cited by examiner

*Primary Examiner*—Lin Ye
*Assistant Examiner*—Jason Whipkey
(74) *Attorney, Agent, or Firm*—Birch, Stewart, Kolasch & Birch, LLP

(57) ABSTRACT

An image pickup apparatus captures an image of an object through an image pickup lens by an image pickup element according to an image pickup operation, generates image data, and records the image data in a recording section. The apparatus includes a microphone that collects speech of a person who takes images, a speech recognition section that recognizes speech output from the microphone and outputs a character code, and an image signal processing section that decides whether a folder having a name code corresponding to the character string code exists in the recording section or not based on the character string code output from the speech recognition section and performs processing of recording the image data in the folder when the character string code matches the name code.

16 Claims, 4 Drawing Sheets

IMAGE PICKUP APPARATUS

This Nonprovisional application claims priority under 35 U.S.C. § 119(a) on Patent Application No(s). 2002-360617 filed in JAPAN on Dec. 12, 2002, the entire contents of which are hereby incorporated by reference.

BACKGROUND OF THE INVENTION

1. Field of the Invention

The present invention relates to an image pickup apparatus which records image data generated according to an image pickup operation in a recording section.

2. Description of the Related Art

For a portable image pickup apparatus such as a hand-held document scanner or digital camera, it is a conventionally known technique to operate such an apparatus by receiving a speech command (e.g., see Patent Document 1).

Furthermore, for a conventional electronic camera, there is also a technique using different folders which exist in a recording section for different purposes (e.g., see Patent Document 2).

[Patent Document 1]
Japanese Patent Application Laid-Open No. 2000-215021 (paragraph number 0021, FIG. 1)

[Patent Document 2]
Japanese Patent Application Laid-Open No. 2001-169222 (summary, FIG. 1)

Using different folders for different purposes requires not only image capturing through an image pickup operation but also an operation of specifying a folder to record an image in a recording section such as a recording medium. As pointed out in Patent Document 2, all such operations are conventionally performed through key operations and the problem is that performing this operation every time an image is recorded is complicated and takes much time.

SUMMARY OF THE INVENTION

The present invention has been implemented taking into account the situation described above and it is an object of the present invention to provide an image pickup apparatus capable of easily performing image control after image taking.

The image pickup apparatus which attains the above object is an image pickup apparatus that captures incident light from an object through an image pickup lens by an image pickup element, generates image data according to the image pickup operation and records the image data in a recording section, including: a microphone which collects speech of a person who picks up images; a speech recognition section that recognizes a speech signal output from the microphone and outputs a character string code; and an image signal processing section that decides whether a folder having a name code corresponding to the character string code exists in the recording section or not based on the character string code output from the speech recognition section and performs processing of recording image data in the folder when the character string code matches the name code.

In the image pickup apparatus of the present invention, the person who takes the image inputs speech representing the folder name to the microphone, the speech recognition section converts the speech signal from the microphone to a character string code, and it is decided whether a folder having a name code corresponding to the character string code exists in the recording section or not based on the character string code output from the speech recognition section, and further, processing of recording image data in the folder is performed when the character string code matches the name code. This allows the picked-up image to be controlled using speech and makes image control easier.

Here, in the image pickup apparatus of the present invention if it is decided that no folder having the name code corresponding to the character string code exists in the recording section, the image signal processing section preferably creates a new folder having the name code corresponding to the character string code and then performs processing of recording the image data in the folder.

This allows the picked-up image to be controlled using speech even if no folder for speech data exists.

Here, the speech to be input to the microphone is preferably a keyword representing the content of the image.

As explained above, the present invention can perform image control after image pickup using speech without any key operations.

DETAILED DESCRIPTION OF THE PREFERRED EMBODIMENTS

An embodiment of the present invention will be explained below.

Figure 1:
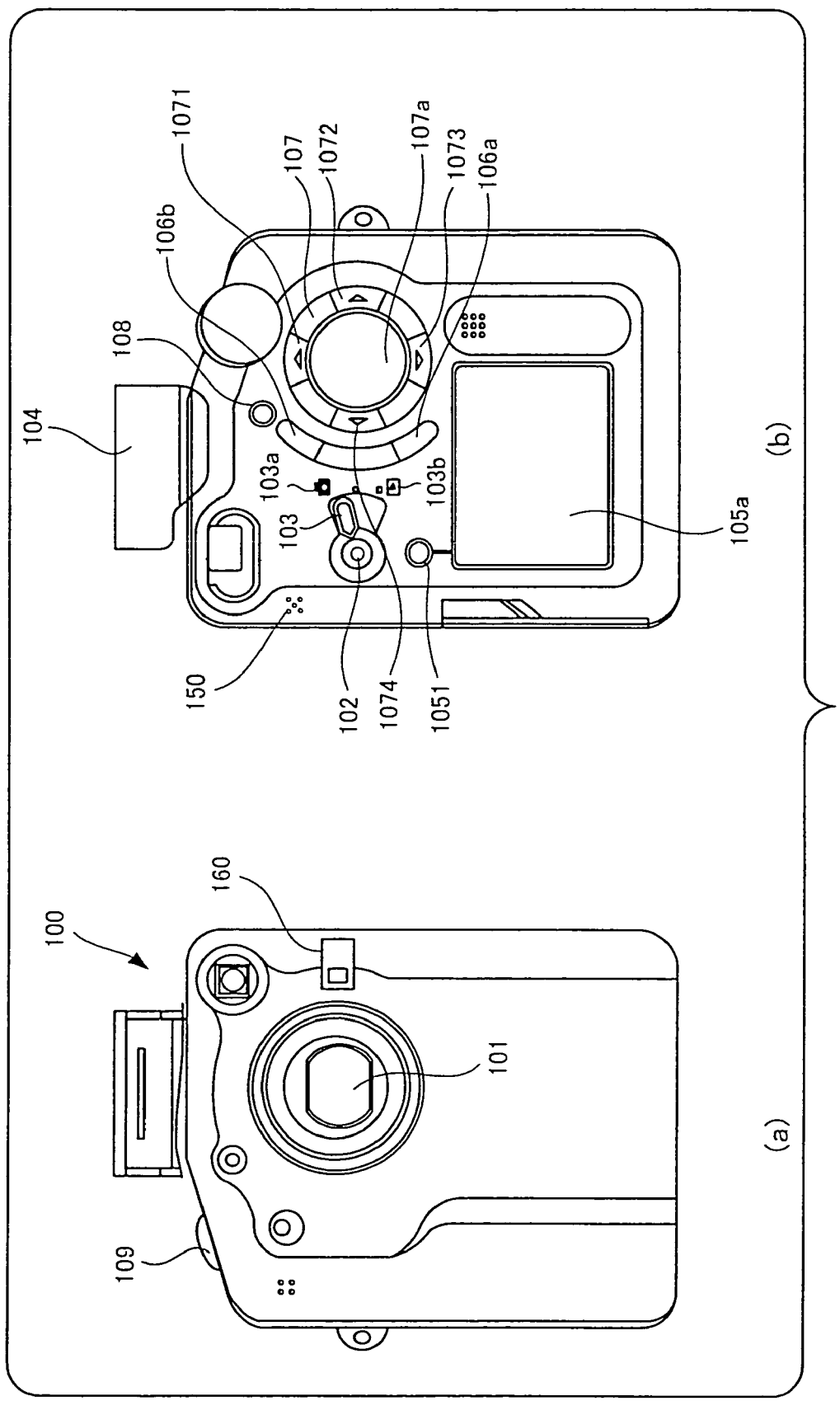
FIG. 1 is an external view of a digital camera which is an embodiment of the image pickup apparatus of the present invention.

FIG. 1 shows an external view of a digital camera which is an embodiment of the image pickup apparatus of the present invention, part (a) of FIG. 1 is a front view and part (b) of FIG. 1 is a rear view.

A digital camera 100 shown in FIG. 1 is designed to guide an image of an object from a photographing lens 101 to a CCD solid-state imaging element provided inside the camera 100. An operation section for the user to perform various operations when using this digital camera 100 is provided on the back of the digital camera 100.

This operation section is provided with a group of operation switches and an LCD screen 105a. The group of operation switches includes a power switch 102 for turning ON power to operate the digital camera, a photographing/reproduction changeover lever 103 which switches between photographing and reproduction freely, an execution key 106a, a cancel key 106b, a cross key 107 and a popup switch 108 for a flash light-emitting section 104, etc. A display section 107a is provided inside this cross key 107 and the cross key 107 allows items in a selection menu displayed on the LCD screen 105a to be selected. Furthermore, a display key 1051 is also provided to decide whether to activate the LCD screen 105a or not. Furthermore, a release button 109 is provided at the top of this digital camera 100. When this release button 109 is pressed, a command for starting photographing is transmitted to a signal processing section, which will be described later, inside the digital camera.

The digital camera 100 can freely switch between photographing and reproduction using the photographing/reproduction changeover lever 103. When performing photographing, the user sets the photographing/reproduction changeover lever 103 to a photographing side 103a and when performing reproduction, the user sets the photographing/reproduction changeover lever 103 to a reproduction side 103b. Furthermore, the flash light-emitting section 104 is provided to allow nighttime photographing.

Furthermore, this digital camera 100 incorporates a microphone 150 so that the user can input speech.

Figure 2:
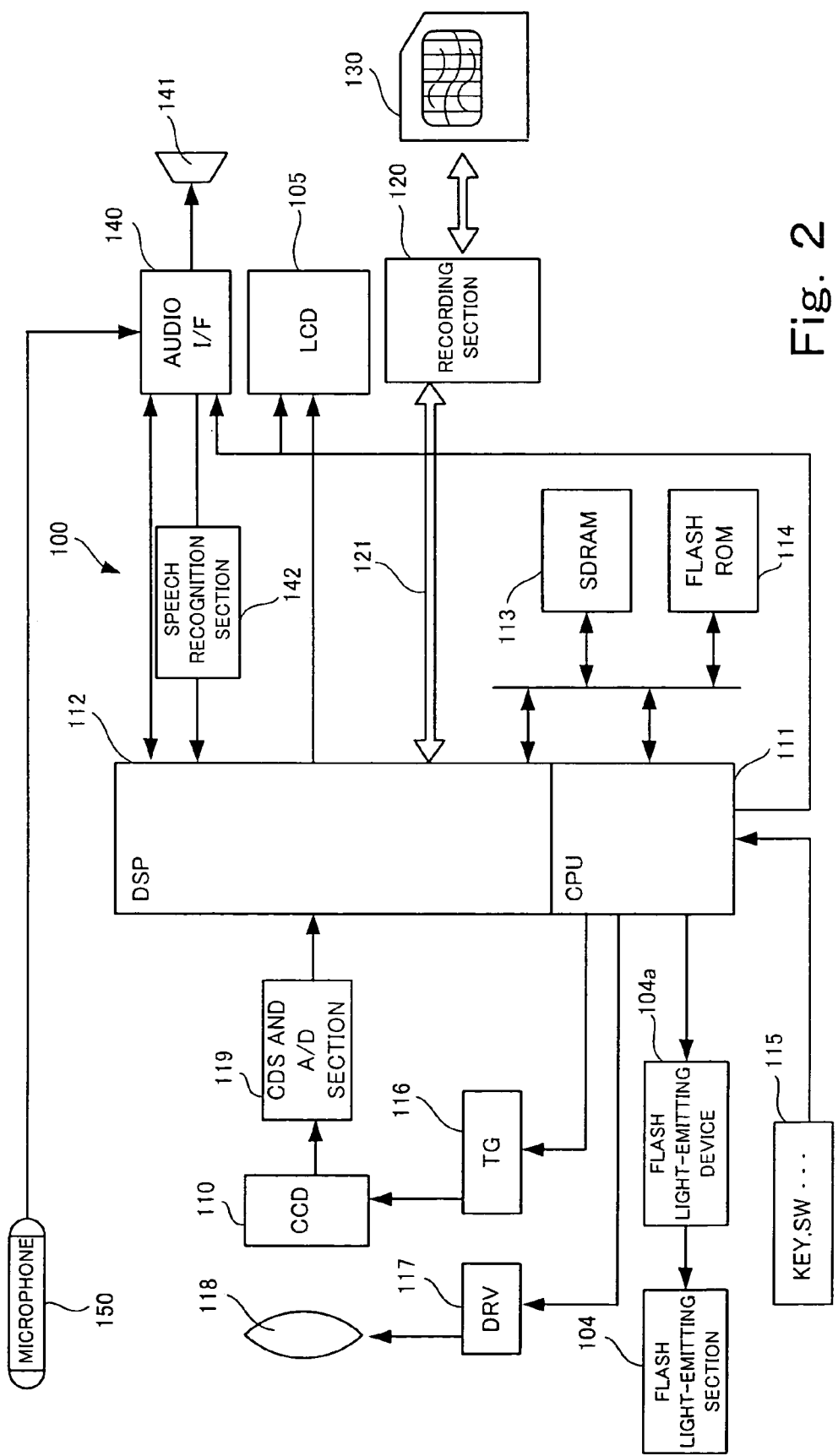
FIG. 2 is a block diagram showing a configuration of a signal processing section provided in the digital camera in FIG. 1.

FIG. 2 is a block diagram showing an example of a signal processing circuit provided inside the digital camera 100.

All processing in the digital camera 100 of this embodiment is controlled by a CPU 111 and under the control of this CPU 111, a DSP 112 processes image data obtained by a CCD solid-state imaging element 110. This CPU 111 and DSP 112 are connected by a bus (not shown) and data is exchanged through this bus. Furthermore, an SDRAM 113 and flash ROM 114 are connected to the CPU 111, the SDRAM 113 stores image data to be processed by the DSP 112 and the flash ROM 114 stores a program to be executed by the CPU 111. FIG. 2 indicates using arrows that the image data stored in the SDRAM 113 is read by the DSP 112.

The input part of this CPU 111 receives an electric signal according to an operation of an operation section 115 made up of various keys and switches shown in FIG. 1. This operation section 115 specifically includes the power switch 102, the photographing/reproduction changeover lever 103, the display key 1051, the execution key 106a, the cancel key 106b the cross key 107 made up of four keys; UP key 1071, RIGHT key 1072, DOWN key 1073, and LEFT key 1074 and a shutter switch actuated by pressing the release button 109.

A speech signal from the microphone 150 is sent through an audio interface 140, converted to a digital signal by this audio interface 140, received by the DSP 112, and this received signal is stored in the DSP 112, and the stored signal is converted to an analog signal through the audio interface 140 and supplied to a speaker 141 if necessary. A speech signal processing section is provided in the DSP 112 and performs processing on the speech signal necessary for speech input/output devices such as the microphone 150 and speaker 141. The speech signal processing section is also used when motion pictures are taken by the digital camera of this embodiment, or used for other purposes.

Further, in the digital camera 100 of this embodiment, the output of the audio interface 140 is also input to a speech recognition section 142 for speech recognition and character data obtained by the speech recognition is also input to the DSP 112.

Furthermore, the digital camera 100 of this embodiment allows the LCD screen 105a (see FIG. 1) provided in an LCD display section 105 to show a display menu and items shown in the menu can be selected by the cross key 107.

Using this cross key 107, it is possible to select any one of items from the selection menu displayed on the LCD screen 105a. Of the four keys of the cross key shown in FIG. 1, pressing the UP key 1071 moves a cursor shown on the LCD screen 105a upward and pressing the RIGHT key 1072 moves the cursor rightward, and so on.

When these keys 1071 to 1074 are pressed, the fact of the pressing of those keys 1071 to 1074 is recognized by the CPU 111 and the CPU 111 transfers a command for moving the cursor to the LCD screen 105a through the bus based on the fact that any one of the keys is pressed. Then, the cursor is moved to any one of the displayed items and any one of the items is selected by the cursor which has moved there.

When the execution key 106a is pressed in a state the cursor is placed at any one of the items, the item is executed. Therefore, the user can select any one of the items from the selection menu using the cursor displayed on the LCD screen 105a.

When the photographing/reproduction changeover lever 103 is changed to the reproduction side 103b, reproduction from the recording medium is performed. At this time, even if a signal from the release button which gives a command for photographing is input from the release button, etc., no processing of photographing is carried out.

Then, the output part of the CPU 111 will be explained.

The output part of the CPU 111 is connected to a timing generator (hereinafter referred to as "TG") 116, a motor driver (hereinafter referred to as "DRV") 117 which drives a focus lens 118 and a flash light-emitting device 104a which causes the flash light-emitting section 104 to perform flash light emission.

When an image is taken, the image of an object is displayed on the LCD screen 105a according to the movement of the object. While viewing this object image displayed, the user performs framing and when the user presses the release button 109, the image is finally taken. When this release button 109 is pressed, the CPU 111 outputs a command for instructing a start of photographing to the TG 116. Upon receipt of this command, the TG 116 supplies a signal informing that the release button 109 has been pressed to the CCD solid-state imaging element 110. Upon receipt of this signal, the CCD solid-state imaging element 110 outputs, as an RGB signal, an image pickup signal of an image taken by the CCD solid-state imaging element 110 when the release button 109 is pressed.

Hereinafter, how the image pickup signal taken by the CCD solid-state imaging element 110 is processed will be explained sequentially.

The image pickup signal acquired at the CCD solid-state imaging element 110 is converted to an RGB signal and supplied to the CDS and A/D section 119. At this CDS and A/D section 119, noise is reduced, and the signal is converted to a digital signal and supplied to the DSP 112 as a digital RGB signal. This DSP 112 includes various signal processing sections such as an image signal processing section, compression processing section, AE (Auto Exposure) detection section, AWB (Auto White Balance) detection section, video encoder and speech signal processing section.

This DSP 112 applies a series of processes to the image data made up of the RGB signal obtained by the CCD solid-state imaging element 110 and the processed image data is output to output devices such as the LCD display section 105 having the LCD screen 105a and a recording section 120 in which a recording medium 130 is loaded. With respect to speech, the DSP 112 performs, in its speech signal processing section, processing on a speech signal necessary for speech input/output devices such as the microphone 150 and speaker 141. In the digital camera 100 of this embodiment, a speech signal from the microphone 150 is received by the DSP 112 through the audio interface 140 and the received signal is stored in the DSP 112 and the stored signal is supplied to the speaker 141 through the audio interface 140 if necessary. The speech signal processing section in the DSP 112 is also used when motion pictures are taken by the digital camera, or used for other purposes. This is the flow of an image pickup signal acquired by the CCD solid-state imaging element 110.

Now, the flow of image data when the photographing/reproduction changeover lever 103 is changed to the photographing side 103a and photographing is performed will be explained in detail.

When a photograph is taken, the photographing/reproduction changeover lever 103 connected to the input part of the CPU 111 is changed to the photographing side 103a.

In this digital camera 100, even if the release button 109 is not pressed, the image of an object to which the image-taking lens is directed is always shown on the LCD screen 105a of the LCD display section 105 as a through image. This through image displayed is acquired when image data consisting of an RGB signal read from the CCD solid-state imaging element 110 at predetermined intervals is converted to a YC signal by the image signal processing in the DSP 112 and the YC signal is supplied to the LCD display section 105 through the video encoder in the DSP 112. When such a through image is displayed, the DSP 112 carries out camera-specific signal processing such as exposure adjustment and focusing for each through image.

When the desired object is shown as a through image on the LCD screen 105a, the user presses the release button 109. When the user presses the release button 109, the CPU 111 outputs a command for starting photographing to the TG 116. Upon receipt of this command, the CCD solid-state imaging element 110 outputs an RGB signal for generating image data to be recorded.

This output RGB signal is converted to a digital signal by the CDS and A/D conversion section 119, guided into the DSP 112 by an image input controller in the DSP 112, the guided RGB signal is supplied to the SDRAM 113 through the bus in the DSP 112 and the RGB signal which is a digital signal is written into the SDRAM 113. When the capturing of the RGB signal corresponding to the image data to be generated in this photographing is completed, the RGB signal is read from the SDRAM 113 and supplied to the DSP 112. At the DSP 112, the RGB signal is converted to a YC signal, the image data compressed in the DSP 112 is supplied to the recording section 120 through an interface 121 and the image data is recorded as a JPEG compressed file in the recording medium 130 loaded in this recording section 120.

This DSP 112 and CPU 111 are connected through the bus and addresses and data are exchanged through this bus. The CPU 111 is provided with various registers inside and the contents of these registers are rewritten according to the progress of processing of various signal processing sections. The CPU 111 makes out the contents of these registers and carries out processing according to the procedure of the program stored in the flash ROM 114.

This is the flow of image data when photographing is carried out by the digital camera 100 of this embodiment until the image data is recorded in the recording medium 130.

The digital camera of the present invention allows photographing operations and image control to be carried out by a speech operation as shown below.

As shown in FIG. 1 and FIG. 2, the microphone 150 built in the digital camera 100 is connected to the audio interface 140 and the output of this audio interface 140 is input to the DSP 112 through the speech recognition section 142.

Figure 3:
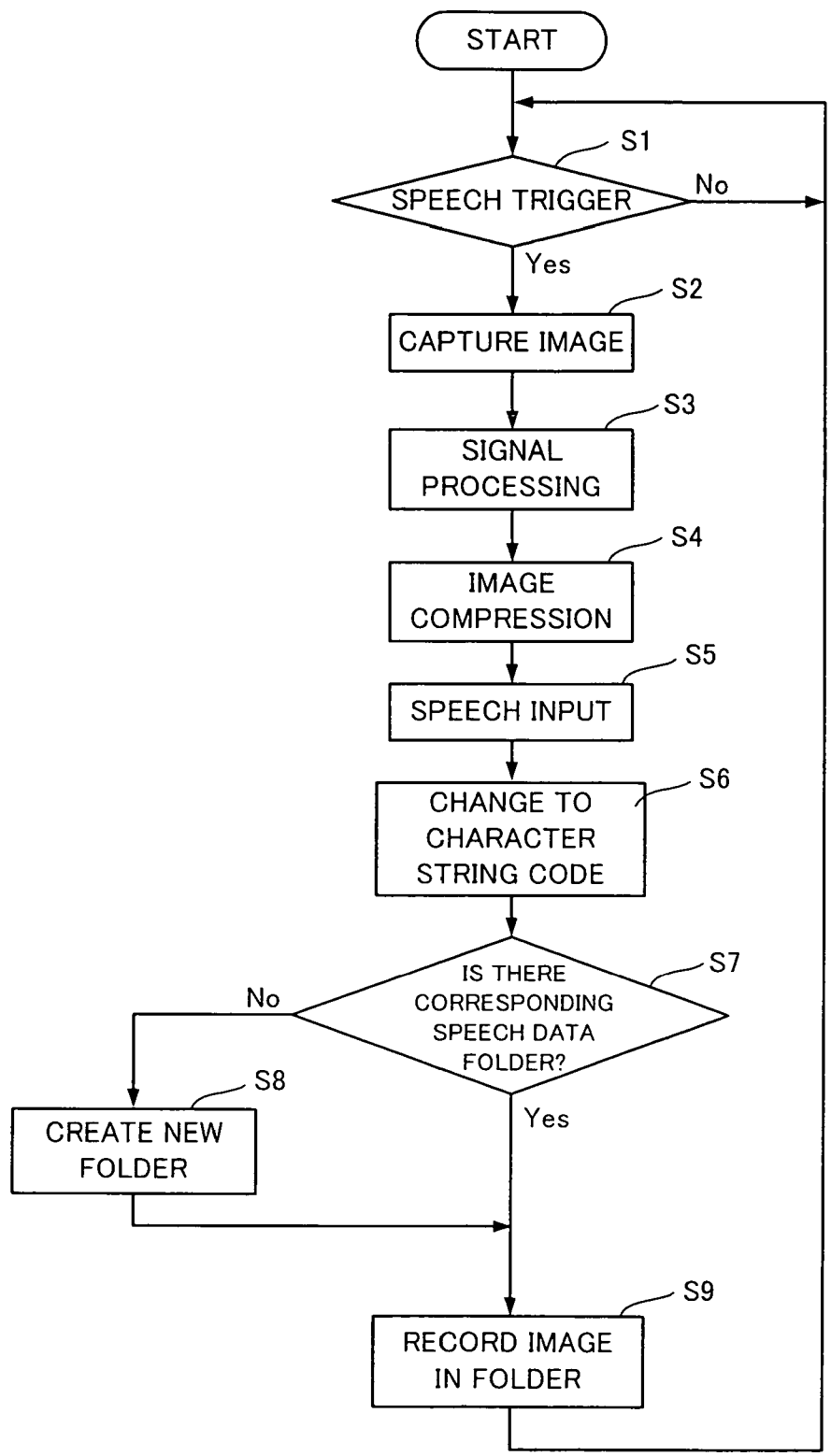
FIG. 3 is a flow chart showing an operation of the digital camera of the embodiment.

FIG. 3 is a flow chart showing the flow of an photographing operation and an image control operation using speech.

When a selection menu is displayed on the LCD screen 105a and a mode of carrying out an operation by speech is selected by operating the cursor keys 1071 to 1074, etc., the processing according to the flow chart shown in this FIG. 3 is carried out.

While the mode of carrying out the operation by speech is selected, if a message, for example, "photograph" is input from the microphone 150 instead of operating the release button 109 during photographing, a speech trigger is input to the DSP 112 through the audio interface 140 (step S1), a command for starting photographing is issued from the CPU 111 to the TG 116, the CCD solid-state imaging element 110 which has received this start command captures an image (step S2) and the CCD solid-state imaging element 110 outputs an RGB signal which forms a basis of image data for recording.

This output RGB signal is converted to a digital signal by the CDS and A/D conversion section 119, guided into the DSP 112 through the image input controller in the DSP 112, the guided RGB signal is supplied to the SDRAM 113 through the bus in the DSP 112 and the RGB signal which is a digital signal is written into the SDRAM 113 (step S3). When the capturing of the RGB signal corresponding to the image data to be generated in this photographing is completed, the RGB signal is read from the SDRAM 113 and supplied to the DSP 112. At the DSP 112, the RGB signal is converted to a YC signal, subjected to JPEG compression processing in the DSP 112 and the compressed image data is stored in the SDRAM 113 again (step S4).

In this embodiment, processing for recording data in the recording medium 130 is also carried out by speech. That is, in a stage in which the compressed image data is stored in the SDRAM 113, if the user voices a keyword expressing the content of an image from the microphone 150, for example, "Family" in the case of a family photo or "Friend" in the case of a photo of a friend, the speech output is input through the audio interface 140 to the speech recognition section 142 (step S5), converted to a character string code at the speech recognition section 142 (step S6) and input to the DSP 112. The DSP 112 decides whether a folder for speech data of a name code corresponding to the character string code exists in the recording medium loaded in the recording section 130 or not (step S7). If the folder exists, the compressed image data recorded in the SDRAM 113 is read to the DSP 112, sent to the recording section 120 from the DSP 112, and recorded in the folder in the recording medium 130 loaded in the recording section 120 (step S9). If the folder does not exist, a new folder is created (step SB) and similar processing is carried out thereafter. Thus, the JPEG-compressed image data is recorded in the recording medium 130 as a JPEG compressed file.

Figure 4:
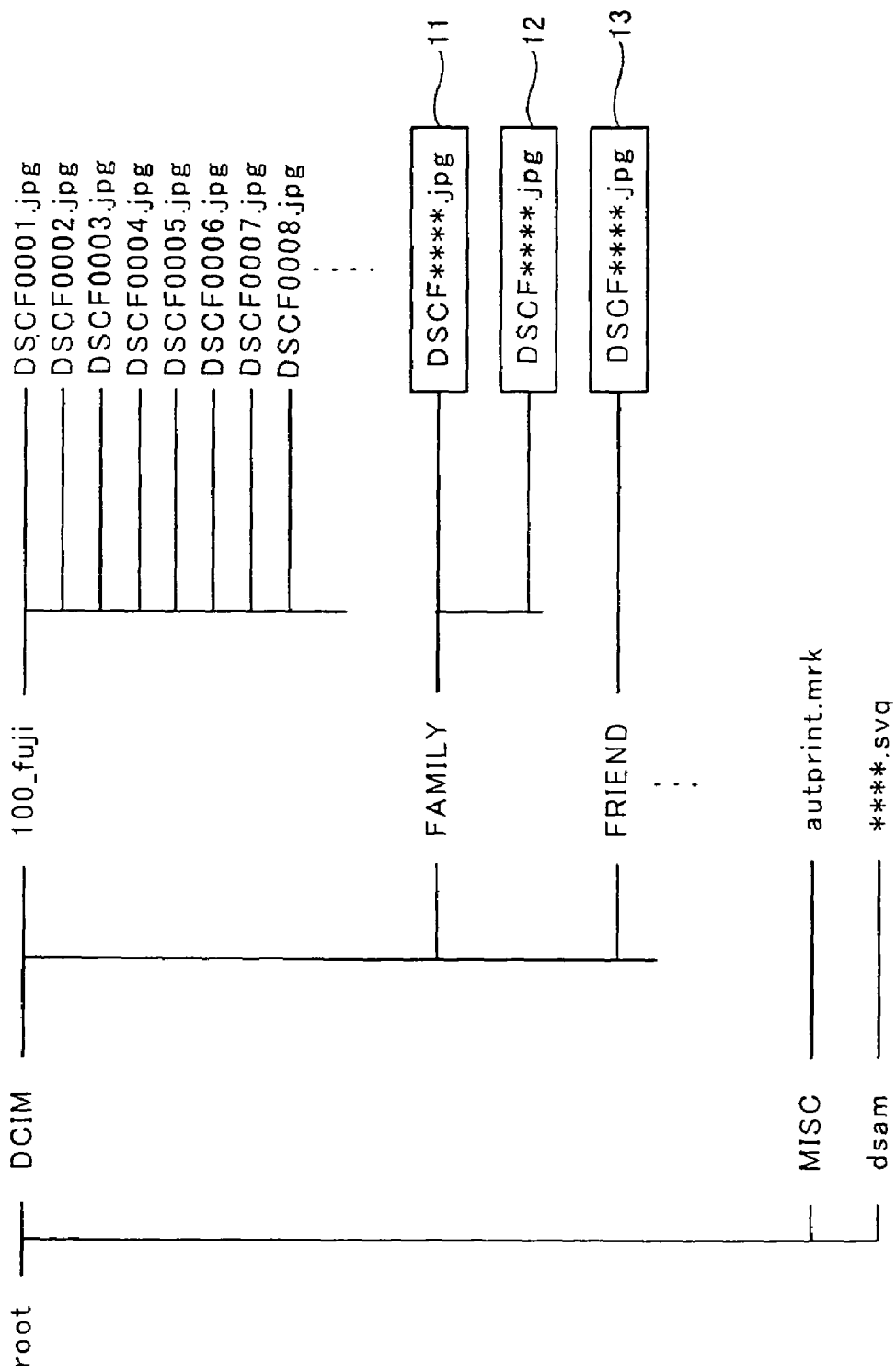
FIG. 4 illustrates an example of a hierarchic folder structure of a recording medium.

FIG. 4 is a conceptual diagram showing an example of a hierarchic folder structure of the recording medium 130. In the formatted recording medium 130, image (DCIM), speech (dsam) and other (MISC) folders are created under a root and a folder "100_fuji" is prepared under the DCIM folder. While a normal mode is selected in which no specific folder is specified, if the shutter button 109 is pressed, image data subjected to JPEG compression processing is generated every time the shutter button 109 is pressed and files (DSCF0001.jpg, DSCF0002.jpg, etc., in the example here) storing the respective image data are created in the folder "100_fuji" one by one. The folder name "100_fuji" can be changed to a desired name according to the operation. Here, in FIG. 4, a folder "Family" and a folder "Friend" are shown. However, suppose theses folders are not prepared yet, and how these folders are prepared when folder names "Family" and "Friend" are specified by speech will be explained below.

Here, a mode of instructing photographing and specifying a folder through speech is selected and photographing is performed using a command by speech. Then, if "Family" is voiced as a name of a folder to store JPEG compressed image data generated by that photographing operation, the pronunciation "Family" is recognized and a folder "Family" is prepared and a file 11 storing the JPEG compressed image data acquired through this photographing is created in the folder.

Then, the next photographing is performed by a command using speech and if "Family" is voiced again, a file 12 storing the JPEG compressed image data acquired through this photographing is created in the "Family" folder.

Then, further photographing is performed according to an photographing command using speech and when "Friend" is voiced this time. A folder "Friend" is newly prepared since it does not exist yet, and a file 13 for the JPEG compressed image data acquired from this photographing is created in the "Friend" folder.

Image data is stored in a folder having a name specified by speech in this way.

Input speech in this case can be any speech if it is at least a keyword expressing the image content with a single word.

The above-described embodiment is the case where an image is recorded in the recording medium 130, but the present invention is also applicable to a type of a camera which records an image in an image recording memory instead of using a recording medium and in the case of that type of camera, the image can be recorded in a folder in the image recording memory by speech in the like manner.

Furthermore, a digital camera has been taken as an example here, but the present invention is applicable not only to an apparatus having an independent function as a digital camera but also to any composite-type apparatus at least having an image-taking function (a function as an image-taking apparatus) such as a cellular phone incorporating a camera function or PDA (Personal Data Assistant).

What is claimed is:

1. An image pickup apparatus comprising:
   an image pickup element that generates image data according to an image pickup operation, by capturing incident light from an object through an image pickup lens;
   a recording section that records the image data;
   a microphone that collects speech of a person who picks up images and outputs a speech signal, wherein the speech includes a keyword representing the content of an image;
   a speech recognition section that recognizes the speech signal output from the microphone and outputs a character string code; and
   an image signal processing section that
      decides, after the image is obtained by the image pickup element, whether a folder having a name code corresponding to the character string code exists in the recording section or not based on the character string code output from the speech recognition section and
      performs processing of recording image data representing the image in the folder when the character string code matches the name code.

2. The image pickup apparatus according to claim 1, wherein when it is decided that no folder having the name code corresponding to the character string code exists in the recording section, the image signal processing section creates a new folder having the name code corresponding to the character string code and then performs processing of recording the image data in the created folder.

3. The image pickup apparatus according to claim 1, wherein the microphone, the speech recognition section, and the image signal processing section are integrally connected within a single container.

4. The image pickup apparatus according to claim 3, wherein the image pickup apparatus is a digital camera.

5. The image pickup apparatus according to claim 1,
   wherein the speech recognition section recognizes a speech trigger command from the speech collected by the microphone, and
   wherein the image signal processing section initiates the image pickup operation when the speech trigger command is recognized by the speech recognition section.

6. The image pickup apparatus according to claim 5, wherein the speech recognition section recognizes the speech trigger command when the person selects a speech control image operation mode of the image pickup apparatus.

7. A method to capture and store image data, comprising:
   generating the image data by capturing an image of an object;
   collecting a speech of a person initiating the image capture, wherein the speech includes a keyword representing the content of the image;
   generating a character string code representing the speech of the user;
   determining whether a folder having a name code corresponding to the character string code exists in a recording medium; and
   storing the image data in the corresponding folder of the recording medium when it is determined that the corresponding folder exists in the recording medium.

8. The method according to claim 7, further comprising:
   creating the corresponding folder in the recording medium when it is determined that the corresponding folder does not exist in the recording medium; and
   storing the image data in the created corresponding folder of the recording medium.

9. The method according to claim 7, further comprising:
   determining whether the person provided a speech trigger command,
   wherein the step of generating the image data by capturing the image of the object is performed when it is determined that the person provided the speech trigger command.

10. The method according to claim 9, further comprising:
    determining whether an image pickup apparatus used by the person initiating the image capture is in a speech control image operation mode,
    wherein the step of determining whether the person provided the speech trigger command is performed when it is determined that the image pickup apparatus is in the speech control image operation mode.

11. The method according to claim 7,
    wherein the step of generating the image data is performed using an image pickup element,
    wherein the step of collecting the speech of the person initiating the image capture is performed using a microphone,
    wherein the step of generating the character string code is performed using a speech recognition section,
    wherein the step of determining whether the folder having the name code corresponding to the character string code exists in the recording medium and the step of storing the image data in the recording medium are performed using an image signal processing section, and
    wherein the image pickup element, the microphone, the speech recognition section, and the image signal processing section are integrally connected within a single image pickup apparatus container.

12. A digital camera, comprising:
    an imaging section configured to image an object to generate image data of the object;
    a speech recognition section configured to recognize speech of a person and to generate a character string code representing the speech of the person, wherein the speech includes a keyword representing the content of the image data;

a processing section configured to generate processed image data by processing the image data generated by the imaging section and to control operations of the digital camera; and a recording section configured to read and write the processed image data from and to a removable recording medium, wherein the processing section determines whether a folder corresponding to the character string code generated by the speech recognition section exists in the removable recording medium, controls the recording section to store the processed image data in the folder when it is determined that the folder already exists in the removable recording medium, and controls the recording section to create the folder in the removable recording medium prior to controlling the recording section to store the processed image data in the folder when it is determined that the folder does not already exist in the removable recording medium.

13. The digital camera of claim 12, wherein the speech recognition section recognizes a speech trigger command from the person, and wherein the processing section controls the imaging section to image the object and to generate image data of the object upon recognition of the speech trigger command by the speech recognition section.

14. The digital camera of claim 13, further comprising:

a mode selection device configured to allow the person to choose between a normal photographing operation mode and a speech control image operation mode, wherein the speech recognition section is configured to recognize the speech trigger command when the person chooses the speech control image operation mode through the mode selection device.

15. The digital camera of claim 12, further comprising:

an internal RAM configured to store the image data generated by the imaging section, wherein the processing section generates the processed image data by processing the image data stored within the internal RAM.

16. The digital camera of claim 12, further comprising:

an internal ROM configured to store a program, wherein the processing section generates the processed image data and controls the operations of the digital camera based on the program stored in the internal ROM.

* * * * *